United States Patent
Mano

(10) Patent No.: US 12,409,775 B2
(45) Date of Patent: Sep. 9, 2025

(54) VEHICLE HEADLAMP HAVING A LAMP UNIT WITH A MATRIX OF LIGHT EMITTING UNITS EMITTING A PLURALITY OF IRRADIATION SPOTS AND A BOUNDARY DETERMINATION UNIT AND CONTROL UNIT CONTROLLING THE BOUNDARY ILLUMINANCE

(71) Applicant: KOITO MANUFACTURING CO., LTD., Tokyo (JP)

(72) Inventor: Mitsuharu Mano, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 86 days.

(21) Appl. No.: 18/578,405

(22) PCT Filed: Jul. 7, 2022

(86) PCT No.: PCT/JP2022/027034
§ 371 (c)(1),
(2) Date: Jan. 11, 2024

(87) PCT Pub. No.: WO2023/286693
PCT Pub. Date: Jan. 19, 2023

(65) Prior Publication Data
US 2024/0294112 A1    Sep. 5, 2024

(30) Foreign Application Priority Data
Jul. 16, 2021  (JP) .................................. 2021-118163

(51) Int. Cl.
*B60Q 1/14* (2006.01)
*F21S 41/153* (2018.01)

(52) U.S. Cl.
CPC .......... *B60Q 1/1423* (2013.01); *F21S 41/153* (2018.01); *B60Q 2300/056* (2013.01)

(58) Field of Classification Search
CPC .. F21S 41/151; F21S 41/153; B60Q 2300/056
See application file for complete search history.

(56) References Cited

U.S. PATENT DOCUMENTS 11,713,861 B2 *  8/2023  Huester ................. F21S 41/663
                                                        362/512
2016/0377251 A1   12/2016  Kim
(Continued)

FOREIGN PATENT DOCUMENTS

| EP | 3 858 669 A1 | 8/2021 |
| JP | 2020-055516 A | 4/2020 |
| JP | 2020-104561 A | 7/2020 |

OTHER PUBLICATIONS

International Search Report for PCT/JP2022/027034 dated Aug. 23, 2022 (PCT/ISA/210).

*Primary Examiner* — Robert J May
(74) *Attorney, Agent, or Firm* — Sughrue Mion, PLLC

(57) ABSTRACT

A vehicle headlamp (1) includes: a lamp unit (10); a boundary determination unit (50); and a control unit (CO), in which the control unit (CO) controls the lamp unit (10) such that an illuminance of light irradiating respective irradiation spots (20) in an irradiation spot row (21) formed of irradiation spots (20) irradiated with light from the light emitting elements (13) overlapping the boundary (51) is equal to or lower than the illuminance of light irradiating adjacent irradiation spots (20) in the bright region side of the irradiation spots (20), and is equal to or higher than the illuminance of light irradiating adjacent irradiation spots (20) in the dark region side of the irradiation spots (20), and so that the total amount of light irradiating the irradiation spot row (21) decreases depending on the proportion of a portion of the irradiation spot row (21) that overlaps the dark region.

13 Claims, 10 Drawing Sheets

(56) References Cited

U.S. PATENT DOCUMENTS

2020/0207254 A1     7/2020   Iriba
2022/0034469 A1*   2/2022   Mochizuki ............ F21S 41/365

\* cited by examiner

VEHICLE HEADLAMP HAVING A LAMP UNIT WITH A MATRIX OF LIGHT EMITTING UNITS EMITTING A PLURALITY OF IRRADIATION SPOTS AND A BOUNDARY DETERMINATION UNIT AND CONTROL UNIT CONTROLLING THE BOUNDARY ILLUMINANCE

CROSS REFERENCE TO RELATED APPLICATIONS

This application is a National Stage of International Application No. PCT/JP2022/027034 filed Jul. 7, 2022, claiming priority based on Japanese Patent Application No. 2021-118163 filed Jul. 16, 2021.

TECHNICAL FIELD

The present invention relates to a vehicle headlamp.

BACKGROUND ART

As a vehicle headlamp typified by an automobile headlight, a vehicle headlamp that changes a light distribution pattern of light emitted according to another vehicle located in front of the vehicle or changes a light distribution pattern of light emitted according to a travel state of the vehicle such as making a turn is known. For example, Patent Literature 1 below discloses the former vehicle headlamp.

A vehicle headlamp described in Patent Literature 1 below includes a light source unit having a plurality of light emitting units capable of individually changing the amount of light emitted, and a control unit, and irradiation spots irradiated with light of the respective light emitting units are arranged in a matrix. Therefore, the vehicle headlamp can change the light distribution pattern of the emitted light by changing the amount of light emitted from the light emitting unit. In addition, Patent Literature 1 below discloses that glare given to a driver of another vehicle can be reduced by detecting the another vehicle located in front of the vehicle by a detection unit provided in the vehicle and reducing illuminance of light irradiated to an irradiation spot corresponding to the detected another vehicle to zero. The light shielding region where the illuminance is zero is a quadrangle.

[Patent Literature 1] JP 2020-104561 A

SUMMARY OF INVENTION

In the vehicle headlamp of Patent Literature 1, when the position of the another vehicle with respect to the vehicle changes, the light shielding region moves or the size changes, and the light distribution pattern of the emitted light changes. In the vehicle headlamp of Patent Literature 1, the irradiation spot becomes a part of the light shielding region by setting the illuminance of the light irradiated to the irradiation spot to zero, and the irradiation spot becomes a part of the non-light shielding region by returning the illuminance of the light irradiated to the irradiation spot to the illuminance before being set to zero. Since the light shielding region is a quadrangle, for example, when the light shielding region moves, the row of irradiation spots in contact with the edge of the light shielding region on the moving direction side changes to the light shielding region, and the row of irradiation spots forming the edge of the light shielding region on the opposite side to the moving direction changes to the non-light shielding region. Therefore, the light shielding region instantaneously moves by the width of the irradiation spot in the moving direction. In addition, when the light shielding region becomes larger or smaller, the light shielding region instantaneously increases or decreases by the width of the irradiation spot as in the case of movement. Therefore, the change in the light shielding region is not smooth, and there is a concern that the driver feels uncomfortable about the change in the light distribution pattern of the emitted light.

Therefore, an object of the present invention is to provide a vehicle headlamp that can reduce discomfort caused by a change in a light distribution pattern of emitted light.

In order to achieve the above object, a vehicle headlamp according to the present invention includes a lamp unit that has a plurality of light emitting units capable of individually changing a light amount to emit, and emits light from the plurality of light emitting units such that irradiation spots irradiated with the light from the respective light emitting units are arranged in a matrix, a boundary determination unit that determines a position of a boundary between a bright region to be brightened in a region where the lamp unit can emit light and a dark region to be made darker than the bright region, and a control unit that controls the lamp unit, in which the control unit controls the lamp unit such that, in an irradiation spot row formed of the irradiation spots that overlap the boundary, an illuminance of light irradiated to the irradiation spots in the irradiation spot row becomes equal to or lower than an illuminance of light irradiated to the adjacent irradiation spots in the bright region side of the irradiation spots and equal to or greater than an illuminance of light irradiated to the adjacent irradiation spots in the dark region side of the irradiation spots, and a total amount of light irradiated from the lamp unit to the irradiation spot row becomes smaller according to a proportion of a portion in the irradiation spot row that overlap the dark region.

In this vehicle headlamp, a light distribution pattern of emitted light changes as the position of the boundary changes. One side based on the irradiation spot row is the brightened region, and the other side is the darkened region. The irradiation spot row is located between the brightened region and the darkened region. The illuminance of the light irradiating the respective irradiation spots in the irradiation spot row is equal to or lower than the illuminance of the adjacent brightened region and equal to or higher than the illuminance of the adjacent darkened region. As described above, the total amount of light from the lamp unit irradiating the irradiation spot row decreases depending on the proportion of the portion in the irradiation spot row overlapping the dark region to be darkened. Therefore, in the vehicle headlamp, when the position of the boundary changes and the proportion increases, the irradiation spot row becomes a region to be gradually darkened depending on the increase in the proportion. When the position of the boundary changes and the proportion decreases, the irradiation spot row is gradually brightened depending on the decrease in the proportion. Therefore, in the vehicle headlamp, the change in the light distribution pattern of the emitted light can be made smooth as compared with the case where the entire irradiation spot row is changed from a region to be brightened to a region to be darkened or from a region to be darkened to a region to be brightened at a certain timing. Therefore, in the vehicle headlamp, it is possible to reduce discomfort in the light distribution pattern of the emitted light as compared with this case.

The boundary determination unit may determine the position of the boundary so that a visibility area that a driver of another vehicle visually recognizes outside of the vehicle and the dark region overlap based on other-vehicle information from an other-vehicle detection unit that detects other vehicles.

In the vehicle headlamp, the visibility area and the darkened region can overlap, and glare given to the driver of the other vehicle can be suppressed. Note that the visibility area is, for example, a front window in a case where the other vehicle is an oncoming vehicle, and is, for example, a side mirror, a rear window, an imaging device that images the rear of the vehicle, or the like in a case where the other vehicle is a preceding vehicle.

Alternatively, the boundary determination unit may determine the position of the boundary so that a predetermined region becomes the dark region from an outer edge of the region to which the lamp unit can irradiate light based on self-vehicle information from a travel state detection unit that detects a travel state of the self-vehicle, and the control unit may control the lamp unit so that an amount of the light emitted from the light emitting unit corresponding to the irradiation spot overlapping only the dark region becomes zero.

In the vehicle headlamp, at least a part of the outer shape of the light distribution pattern of the emitted light is substantially the same as at least a part of the boundary. Therefore, in the vehicle headlamp, the outer shape of the light distribution pattern of the emitted light can be changed or the emission direction of the light having a predetermined light distribution pattern can be changed according to the traveling state of the self-vehicle.

When the boundary determination unit determines the position of the boundary on the basis of the other-vehicle information, based on the boundary position information at a first timing at which the other-vehicle information is input and the other-vehicle information, the boundary determination unit may change in stages the position of the boundary during a period from the first timing to a second timing when the other-vehicle information is input immediately after the first timing. Alternatively, based on information on temporal changes of the boundary position in a predetermined period before a first timing including the first timing at which the other-vehicle information is input, and the other-vehicle information, the boundary determination unit may change in stages the position of the boundary during a period from the first timing to a second timing when the other-vehicle information is input immediately after the first timing. Further, when the boundary determination unit determines the position of the boundary on the basis of the self-vehicle information, based on the boundary position information at a first timing at which the self-vehicle information is input and the self-vehicle information, the boundary determination unit may change in stages the position of the boundary during a period from the first timing to a second timing when the self-vehicle information is input immediately after the first timing. Alternatively, based on information on temporal changes of the boundary position in a predetermined period including a first timing when the self-vehicle information is input and before a first timing including the first timing at which the self-vehicle information is input, and the self-vehicle information, the boundary determination unit may change in stages the position of the boundary during a period from the first timing to a second timing when the self-vehicle information is input immediately after the first timing.

Therefore, with such a configuration, the changes in the light distribution pattern of the emitted light can be made smoother, and it is possible to further reduce the sense of discomfort with the changes in the light distribution pattern.

The control unit may control the lamp unit so that illuminance of light irradiating at least one of the irradiation spots in the irradiation spot row becomes low according to a proportion of a portion in the irradiation spot overlapping the dark region.

Therefore, with such a configuration, the changes in the light distribution pattern of the emitted light can be made smoother, and it is possible to further reduce the sense of discomfort with the changes in the light distribution pattern.

In this case, the control unit may control the lamp unit so that the illuminance of light becomes lower in stages according to the proportion.

With such a configuration, the calculation load of the control unit can be reduced.

In this case, a number of stages of the changes of the illuminance of light when the position of the boundary changes so that the proportion increases may be fewer than a number of stages of the changes of the illuminance of light in a case where the position of the boundary changes so that the proportion decreases.

For example, when the boundary determination unit determines the position of the boundary on the basis of the other-vehicle information, glare given to the driver of the other vehicle can be suppressed as described above. Further, the case where the position of the boundary changes so that the proportion increases is a state where the position of the boundary changes so that the irradiation spot row becomes a darkened region, and the case where the boundary determination unit determines the position of the boundary on the basis of the other-vehicle information is a state where the other vehicle approaches the irradiation spot row. Further, the case where the position of the boundary changes so that the proportion decreases is a state where the position of the boundary changes so that the irradiation spot row becomes a brightened region, and the case where the boundary determination unit determines the position of the boundary on the basis of the other-vehicle information is a state where the other vehicle moves away from the irradiation spot row. With the above described configuration, for example, in a state where the speed of the changes in the position of the boundary is constant, the time required for the irradiation spot row to become a darkened region can be made shorter than that in a case where the irradiation spot row becomes a brightened region. Therefore, it is possible to suppress the glare given to the driver of the other vehicle while suppressing the increase in the calculation load of the control unit as compared with the case where the number of stages is constant regardless of the way of changing the position of the boundary.

Further, the control unit may control the lamp unit so that the illuminance of light irradiating a part of the irradiation spots in the irradiation spot row is the illuminance of light irradiating the adjacent irradiation spots in the dark region side of the irradiation spots, and the number of the irradiation spots in the irradiation spot row in which the illuminance of light irradiated is the illuminance of light irradiated to the adjacent irradiation spots in the dark region side of the irradiation spots increases according to the proportion of the portion in the irradiation spot row that overlap the dark region.

According to such a configuration, the calculation load of the control unit can be reduced as compared with the case where the illuminance of the light irradiating the respective irradiation spots in the irradiation spot row is lowered according to the proportion of the portion in the irradiation spot overlapping the dark region.

Further, the control unit may control the lamp unit so that there formed a blurred region that overlap only the bright region and is adjacent to the boundary and that the illuminance of irradiated light becomes lowered in stages as approaching the boundary.

With such a configuration, it is possible to reduce the discomfort of the change in the light distribution pattern as compared with the case where the blurred region is not formed.

In this case, the control unit may control the lamp unit so that, in a case there is the irradiation spot row, the total amount of light from the lamp unit irradiated to a portion of the blurred region that is closer to the bright region than the irradiation spot row decreases according to the proportion of the portion in the irradiation spot row overlapping the dark region.

In the vehicle headlamp, as the total amount of light emitted from the lamp unit to the irradiation spot row decreases, the total amount of light emitted from the lamp unit to the portion decreases. In addition, as the total amount of light from the lamp unit with which the irradiation spot row is irradiated increases, the total amount of light from the lamp unit with which the portion is irradiated increases. For this reason, in the vehicle headlamp, the difference between the brightness of the irradiation spot row and the brightness of the portion can be reduced, and the sense of discomfort in the change in the light distribution pattern can be reduced.

As described above, according to the present invention, it is possible to provide a vehicle headlamp that can reduce discomfort caused by a change in a light distribution pattern of emitted light.

DESCRIPTION OF EMBODIMENTS

Hereinafter, embodiments for implementing a vehicle headlamp according to the present invention will be illustrated together with the accompanying drawings. The embodiments exemplified below are intended to facilitate understanding of the present invention and are not intended to limit the present invention. The present invention can be modified and improved from the following embodiments without departing from the gist thereof. In addition, in the present invention, constituent elements in the following exemplary embodiments may be appropriately combined. In the accompanying drawings, the dimensions of each member may be exaggerated for easy understanding.

First Embodiment

Figure 1:
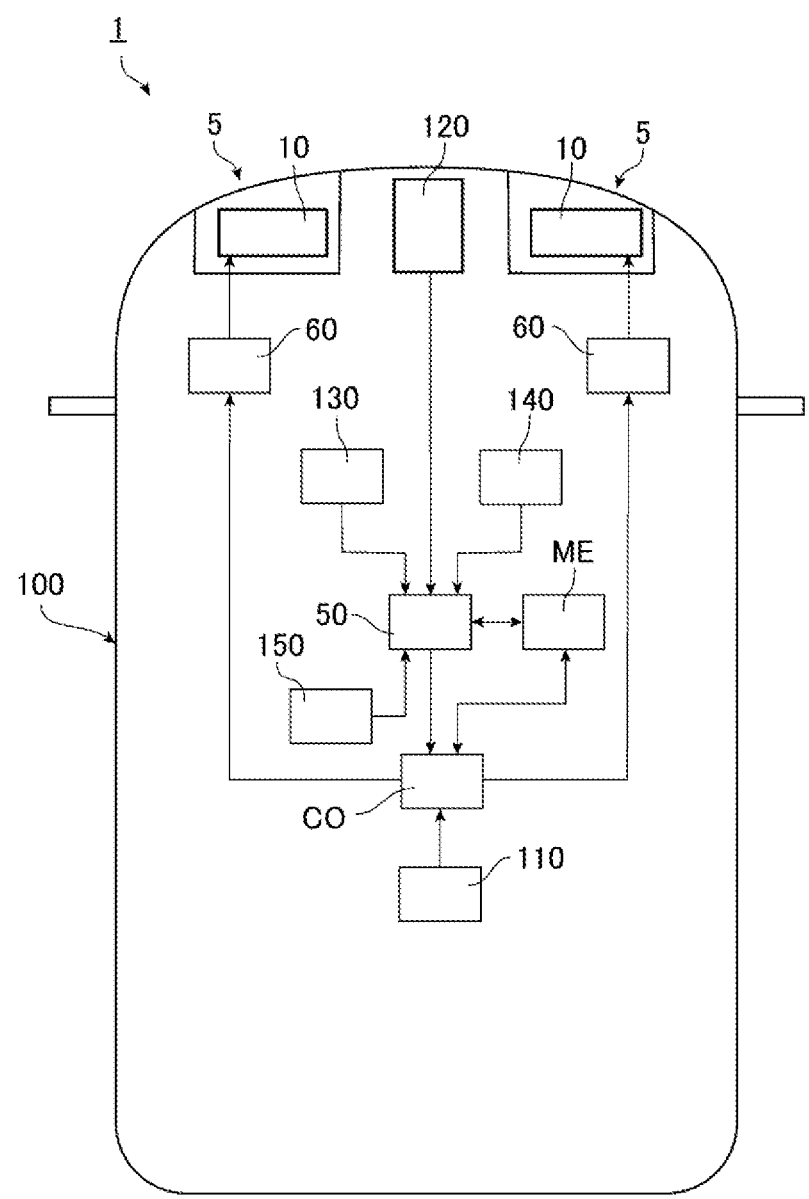
FIG. 1 is a plan view schematically illustrating a vehicle including a vehicle headlamp according to a first embodiment of the present invention.

FIG. 1 is a plan view schematically illustrating a vehicle including a vehicle headlamp according to the present embodiment. As illustrated in FIG. 1, a vehicle 100 according to the present embodiment is an automobile, and includes a vehicle headlamp 1, a light switch 110, an other-vehicle detection unit 120 that detects another vehicle located in front of the vehicle 100, a steering sensor 130, an inclination sensor 140, and a vehicle speed sensor 150.

The vehicle headlamp 1 according to the present embodiment includes a pair of left and right lamps 5, a control unit CO, a boundary determination unit 50, a memory ME, and a pair of power supply circuits 60 as main components. Note that, in the present specification, unless otherwise specified, "right" means the right side from the viewpoint of the driver of the vehicle 100 that is the self-vehicle, and "left" means the left side from the viewpoint of the driver of the vehicle 100 that is the self-vehicle.

According to the present embodiment, the pair of lamps 5 has substantially symmetrical shapes in the left-right direction of the vehicle 100, and emits light of a light distribution pattern changeable toward the front of the vehicle 100. In addition, the configuration of one of the lamps 5 is the same as the configuration of the other of the lamps 5 except that the shape is substantially symmetrical. Therefore, one of the lamps 5 will be described below, and the description of the other of the lamps 5 will be omitted.

Figure 2:
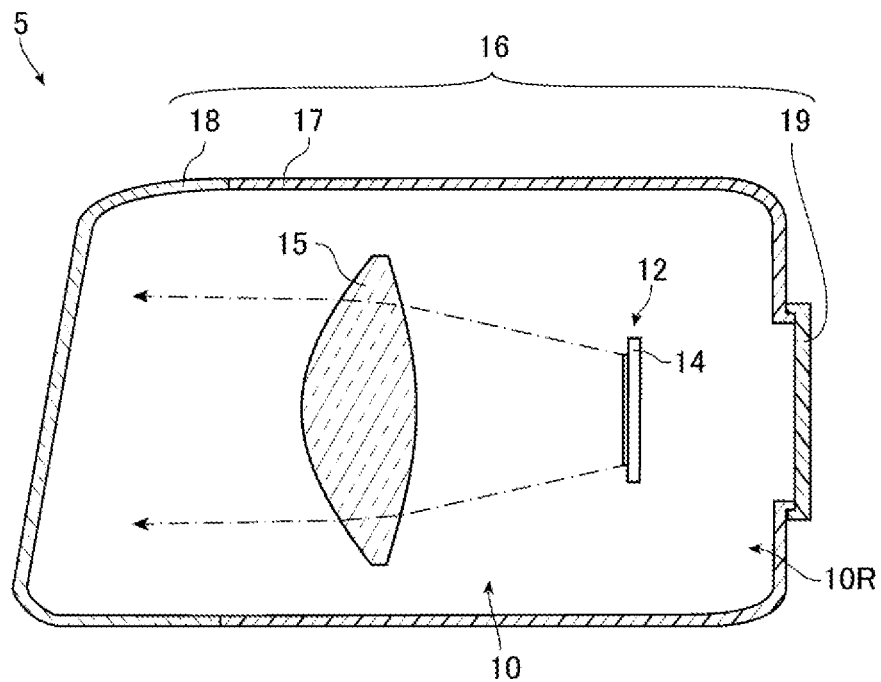
FIG. 2 is a side view schematically illustrating one of the lamps illustrated in FIG. 1.

FIG. 2 is a side view schematically illustrating one of the lamps 5 illustrated in FIG. 1. As illustrated in FIG. 2, the lamp 5 mainly includes a lamp unit 10 and a housing 16. In FIG. 2, the housing 16 is illustrated in a vertical cross section.

The housing 16 mainly includes a lamp housing 17, a front cover 18, and a back cover 19. The front of the lamp housing 17 is opened, and the front cover 18 is fixed to the lamp housing 17 so as to close the opening. Behind the lamp housing 17, an opening smaller than the front is formed, and the back cover 19 is fixed to the lamp housing 17 so as to close the opening. A space formed by the lamp housing 17, the front cover 18, and the back cover 19 is a lamp chamber 10R, and the lamp unit 10 is accommodated in the lamp chamber 10R. The lamp unit 10 mainly includes a light distribution pattern forming unit 12 and a projection lens 15.

Figure 3:
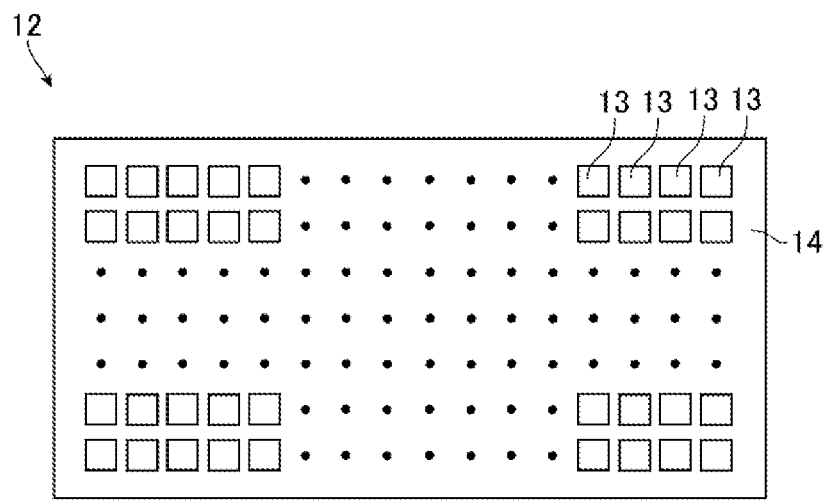
FIG. 3 is a front view schematically illustrating the light distribution pattern forming unit illustrated in FIG. 2.

FIG. 3 is a front view schematically illustrating the light distribution pattern forming unit 12 illustrated in FIG. 2. As illustrated in FIGS. 2 and 3, the light distribution pattern forming unit 12 according to the present embodiment includes a plurality of light emitting elements 13 as light emitting units that emit light, and a circuit board 14 on which the plurality of light emitting elements 13 is mounted. The plurality of light emitting elements 13 is arranged in a matrix form to form rows in the vertical direction and the horizontal direction, and emit light forward. These light emitting elements 13 can individually change the amount of light emitted. According to the present embodiment, the light distribution pattern forming unit 12 has 64 light emitting element groups each including 256 light emitting elements 13 arranged in the horizontal direction, and these light emitting element groups are arranged in the vertical direction. In addition, these light emitting elements 13 are micro LEDs, and the light distribution pattern forming unit 12 is a so-called micro LED array. Note that the number of light emitting elements 13 and the number of light emitting element groups in each light emitting element group are not particularly limited.

Such a light distribution pattern forming unit 12 can form a predetermined light distribution pattern by selecting the light emitting elements 13 that emits light. In addition, the light distribution pattern forming unit 12 can adjust the intensity distribution of light in a predetermined light distribution pattern by adjusting the amount of light emitted from each light emitting element 13. With this configuration, the light distribution pattern forming unit 12 can form a predetermined light distribution pattern according to the amount of light emitted from the plurality of light emitting elements 13.

The projection lens 15 is a lens that adjusts a divergence angle of incident light. The projection lens 15 is disposed in front of the light distribution pattern forming unit 12, light emitted from the light distribution pattern forming unit 12 is incident thereon, and a divergence angle of the light is adjusted by the projection lens 15. The projection lens 15 according to the present embodiment is a lens in which the incident surface and the emission surface are formed in a convex shape, and the rear focal point of the projection lens 15 is located on or near the light emission surface of any one of the light emitting elements 13 in the light distribution pattern forming unit 12. The light whose divergence angle is adjusted by such a projection lens 15 is emitted from the lamp 5 toward the front of the vehicle 100 via the front cover 18.

Figure 4:
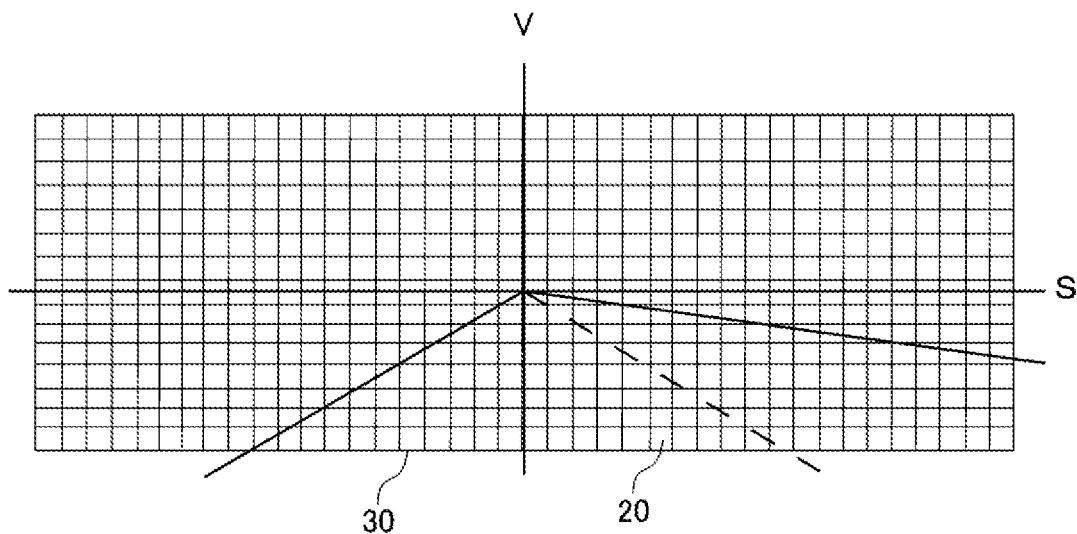
FIG. 4 is a diagram illustrating irradiation spots irradiated with light from the light emitting elements illustrated in FIG. 3.

FIG. 4 is a diagram illustrating irradiation spots irradiated with light from the light emitting elements 13 illustrated in FIG. 3. Irradiation spots 20 illustrated in FIG. 4 are regions irradiated with light from the light emitting elements 13 on a virtual vertical screen arranged 25 m ahead of the vehicle 100. In FIG. 4, S represents a horizontal line, and V represents a vertical line passing through the center of the vehicle 100 in the left-right direction. Since the plurality of light emitting elements 13 in the light distribution pattern forming unit 12 are arranged in a matrix as described above, the irradiation spots 20 irradiated with light from the respective light emitting elements 13 are arranged in a matrix in front of the vehicle 100. Therefore, the lamp unit 10 emits light from the plurality of light emitting elements 13 such that the irradiation spots 20 irradiated with light from the respective light emitting elements 13 are arranged in a matrix. For ease of understanding, the fewer numbers of the plurality of irradiation spots 20 are illustrated in FIG. 4. Each irradiation spot 20 corresponds to one light emitting element 13. The relative position of the specific light emitting element 13 in the plurality of light emitting elements 13 and the relative position of the specific irradiation spot 20 corresponding to the specific light emitting element 13 in the plurality of irradiation spots 20 are reversed vertically and horizontally. For example, the irradiation spot 20 corresponding to the light emitting element 13 located at the upper right end in the viewpoint of the driver of the vehicle 100 is located at the lower left end in the viewpoint of the driver of vehicle 100.

According to the present embodiment, the irradiation spots 20 are square shapes approximately the same size, and the adjacent irradiation spots 20 are in contact with each other. A region 30 formed of all the irradiation spots 20 has a rectangular shape elongated in the left-right direction. The region 30 is a region to which the lamp unit 10 can emit light, the center of the region 30 in the vertical direction is located on or near the horizontal line S, and the center of the region 30 in the horizontal direction is located on or near the vertical line V. The adjacent irradiation spots 20 may overlap each other, or a gap may be formed apart from each other. However, it is preferable that the plurality of irradiation spots 20 are arranged in a matrix without a gap. The shapes of the irradiation spots 20 are not particularly limited, and may be, for example, a rectangular shape. The plurality of irradiation spots 20 may include some irradiation spots 20 having different sizes and shapes.

Next, as the control unit CO illustrated in FIG. 1, for example, an integrated circuit such as a microcontroller, an integrated circuit (IC), a large-scale integrated circuit (LSI), and an application specific integrated circuit (ASIC), or a numerical control (NC) device can be used. In addition, when the NC device is used, the control unit CO may use a machine learning device or may not use a machine learning device. As described later, the control unit CO controls the lamp unit 10.

The light switch 110 according to the present embodiment is a switch that selects emission or non-emission of light, and is connected to the control unit CO. The light switch 110 outputs a signal indicating emission of light to the control unit CO when turned on, and does not output a signal to the control unit CO when turned off.

The other-vehicle detection unit 120 according to the present embodiment includes a camera, a detection unit, and the like (not illustrated). The camera is attached to the front portion of the vehicle 100, and captures images ahead of the vehicle 100 at predetermined time intervals, for example, at intervals of 50 msec. The captured image captured by the camera includes at least a part of the region 30 that can be irradiated with the light emitted from the pair of lamps 5. The detection unit detects the presence of another vehicle from the captured images captured by the camera and the presence position of the another vehicle in the captured images.

When the detection unit detects another vehicle located in front of the vehicle 100, the detection unit outputs a signal indicating other-vehicle information such as the presence of the another vehicle, a captured image obtained by capturing the another vehicle, and the presence position of the another vehicle in the captured image to the boundary determination unit 50. In this case, the detection unit calculates the distance from the vehicle 100 to the another vehicle on the basis of the captured image captured by the camera. For example, when the another vehicle is an oncoming vehicle, a pair of white light spots by light emitted from a headlight of the oncoming vehicle appear in the captured image. The detection unit calculates the distance from the vehicle 100 to the oncoming vehicle on the basis of the distance between the pair of white light spots, and outputs a signal indicating the calculated distance to the boundary determination unit 50. In addition, in a case where the another vehicle is a preceding vehicle, a pair of red light spots due to light emitted from the tail light of the preceding vehicle appear in the captured image. The detection unit calculates the distance from the vehicle 100 to the preceding vehicle on the basis of the distance between the pair of red light spots and the like, and outputs a signal indicating the calculated distance to the boundary determination unit 50.

On the other hand, when the detection unit does not detect other vehicles located in front of the vehicle 100, the detection unit outputs a signal indicating that other vehicles are not detected to the boundary determination unit 50. As described above, the camera captures images ahead of the vehicle 100 at predetermined time intervals. For this reason, a signal indicating the other-vehicle information or a signal indicating that the other vehicle is not detected is output from the detection unit to the boundary determination unit 50 substantially at predetermined time intervals. When not detecting other vehicles, the detection unit may not output the signal to the boundary determination unit 50.

Examples of the configuration of the detection unit include a configuration similar to that of the control unit CO, and examples of the camera include a charged coupled device (CCD) camera.

Note that the configuration of the other-vehicle detection unit 120, the method of detecting the other vehicles by the other-vehicle detection unit 120, the method of calculating the distance from the vehicle 100 to the other vehicles, and the other-vehicle information output from the other-vehicle detection unit 120 to the boundary determination unit 50 are not particularly limited. For example, the other-vehicle detection unit 120 may further include an image processing unit that performs image processing on the captured image captured by the camera, and the detection unit may detect the presence of the other vehicles and the presence position of the other vehicles in the captured image from the information subjected to the image processing by the image processing unit. The other-vehicle detection unit 120 may further include a millimeter-wave radar, a lidar, or the like capable of detecting an object located in front of the vehicle 100. In this case, the other-vehicle detection unit 120 may detect the presence of the other vehicles located in front of the vehicle 100, the position of the other vehicles with respect to the vehicle 100, and the distance from the vehicle 100 to the other vehicles on the basis of the captured image obtained by the camera and the information obtained by the millimeter wave radar, the rider, or the like.

The steering sensor 130 is a travel state detection unit that detects a travel state of the vehicle 100, and is a sensor that detects a steering angle of the vehicle 100. The steering sensor 130 detects a steering angle from, for example, a rotation angle of a steering wheel of the vehicle 100. The steering sensor 130 detects the right steering angle and the left steering angle while identifying the right steering angle and the left steering angle as different steering angles, and outputs a signal indicating the detected steering angle as self-vehicle information to the boundary determination unit 50.

The inclination sensor 140 is a travel state detection unit that detects a travel state of the vehicle 100, and is a sensor that detects an inclination angle in a pitch direction of the vehicle 100. The inclination sensor 140 is, for example, a gyro sensor. The inclination sensor 140 outputs a signal indicating the detected inclination angle, which is self-vehicle information, to the boundary determination unit 50.

The vehicle speed sensor 150 is a travel state detection unit that detects a travel state of the vehicle 100, and is a sensor that detects a traveling speed of the vehicle 100. For example, the inclination sensor 140 detects the traveling speed from the rotation speed of the tire. The vehicle speed sensor 150 outputs a signal indicating the detected traveling speed as self-vehicle information to the boundary determination unit 50.

The boundary determination unit 50 determines a position of a boundary between a bright region to be brightened and a dark region to be darker than the bright region in the region 30 where the lamp unit 10 can emit light, and outputs a signal indicating the position of the boundary to the control unit CO. The boundary determination unit 50 according to the present embodiment determines the position of the boundary on the basis of the other-vehicle information from the other-vehicle detection unit 120 so that a visibility area for the driver of the other vehicle detected by the other-vehicle detection unit 120 to visually recognize the outside of the vehicle overlaps with the dark region. Therefore, this boundary is not determined in advance. However, the boundary determination unit 50 may determine the position of the boundary by selecting from a plurality of predetermined boundary positions on the basis of the other-vehicle information from the other-vehicle detection unit 120. Examples of the visibility area for the driver of the other vehicle to visually recognize the outside of the vehicle include a front window in a case where the other vehicle is an oncoming vehicle, and examples of the visibility area include a side mirror, a rear window, and an imaging device that images the rear of the vehicle in a case where the other vehicle is a preceding vehicle. The dark region defined by the boundary preferably overlaps the entire visibility area. According to the present embodiment, the boundary determination unit 50 determines a position of a boundary where a rectangular region overlapping the entire other vehicle is a region to be darkened and the other region is a bright region to be brightened in the region 30 on the virtual vertical screen arranged 25 m ahead of the vehicle 100. Therefore, the boundary has a rectangular shape surrounding the entire other vehicle. In addition, a predetermined gap is formed between this boundary and the outer edge of another vehicle. The boundary determination unit 50 determines the position of such a boundary, outputs a signal indicating the boundary to the control unit CO, and stores information on the position of the boundary in the memory ME to be described later. Therefore, the memory ME stores information on the temporal change of the position of the boundary. The boundary determination unit 50 does not determine the position of the boundary when the distance from vehicle 100 to another vehicle is a predetermined distance or more, for example, 200 m or more. However, the boundary determination unit 50 may determine the position of the boundary regardless of the distance from the vehicle 100 to an other vehicle 90. The shape of the boundary is not particularly limited. Examples of the configuration of the boundary determination unit 50 include the same configuration as the control unit CO. Note that the control unit CO may also serve as the boundary determination unit 50.

One of the power supply circuits 60 corresponds to one of the lamps 5, and the other of the power supply circuits 60 corresponds to the other of the lamps 5. Each of the power supply circuits 60 includes a driver, and when a signal is input from the control unit CO, the power supplied to each of the light emitting elements 13 of the lamp unit 10 is adjusted by the driver. In this manner, the amount of light emitted from each light emitting element 13 is adjusted. According to the present embodiment, the driver of the power supply circuit 60 adjusts the power supplied to each light emitting element 13 by pulse width modulation (PWM) control, thereby adjusting the amount of light emitted from each light emitting element 13. However, a method of adjusting the amount of light emitted from each light emitting element 13 is not particularly limited.

The memory ME is configured to store information and read the stored information. The memory ME is, for example, a non-transitory recording medium, and is preferably a semiconductor recording medium such as a random access memory (RAM) or a read only memory (ROM), but may include a recording medium of any format such as an optical recording medium or a magnetic recording medium. Note that the "non-transitory" recording medium includes all computer-readable recording media except for a transitory propagating signal, and does not exclude a volatile recording medium.

The memory ME according to the present embodiment stores information and the like regarding power supplied to each light emitting element 13 when emitting a high beam.

Figure 5:
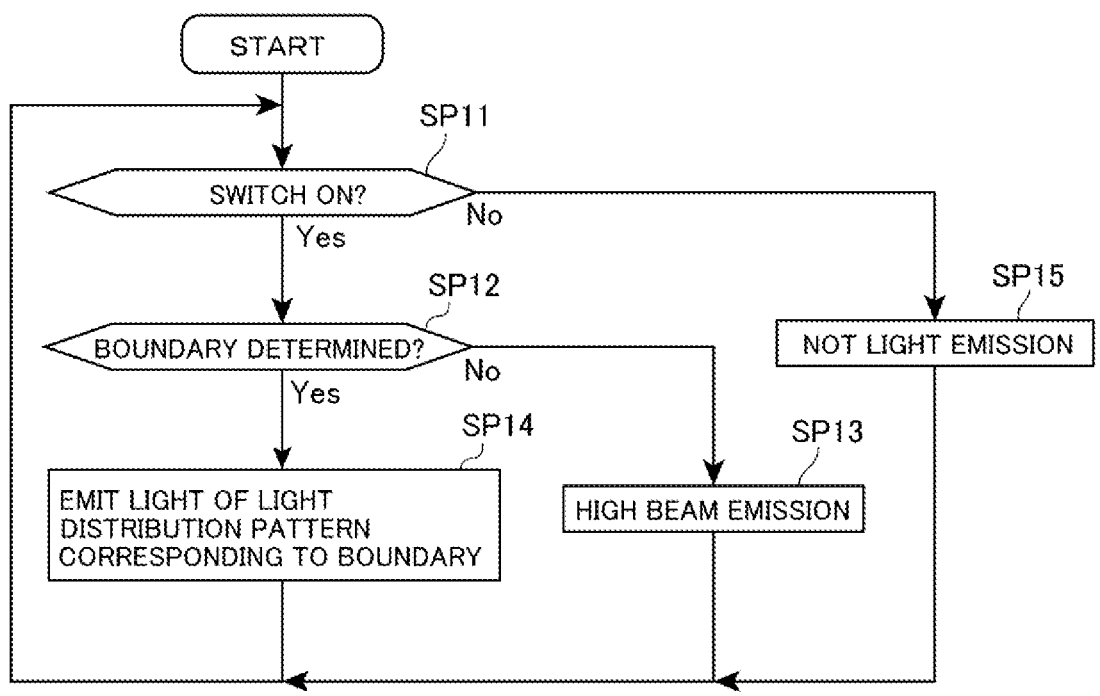
FIG. 5 is a diagram illustrating an example of a control flowchart of a control unit according to the first embodiment.

Next, the operation of the vehicle headlamp 1 according to the present embodiment will be described. Specifically, the operation of changing the light distribution pattern of the emitted light according to the other vehicle detected by the other-vehicle detection unit 120 will be described. FIG. 5 is a diagram illustrating an example of a control flowchart of the control unit CO according to the present embodiment. As illustrated in FIG. 5, the control flow according to the present embodiment includes steps SP11 to SP15.

(Step SP11)

In this step, the control unit CO determines whether or not a signal is input from the light switch 110. When this signal is input to the control unit CO, the control unit CO advances the control flow to step SP12. On the other hand, when this signal is not input to the control unit CO, the control unit CO advances the control flow to step SP15. For this reason, it can be understood that the determination of the control unit CO can change the following step to proceed by distinguishing the case according to the input signal.

(Step SP12)

In this step, the control unit CO determines whether or not the position of the boundary is determined by the boundary determination unit 50 on the basis of the signal input from the boundary determination unit 50. In a case where this signal is not input to the control unit CO, the control unit CO advances the control flow to step SP13. On the other hand, when this signal is input to the control unit CO, the control unit CO advances the control flow to step SP14.

(Step SP13)

In this step, the control unit CO controls the lamp unit 10 so that the high beam is emitted from the vehicle headlamp 1. Specifically, the control unit CO refers to the information stored in the memory ME, and outputs a control signal based on the power supplied to each light emitting element 13 when emitting the high beam to the power supply circuit 60. The power supply circuit 60 supplies power from a power supply (not illustrated) to each light emitting element 13 on the basis of this signal. Therefore, a high beam is emitted from the vehicle headlamp 1. Then, the control unit CO returns the control flow to step SP11.

Figure 6:
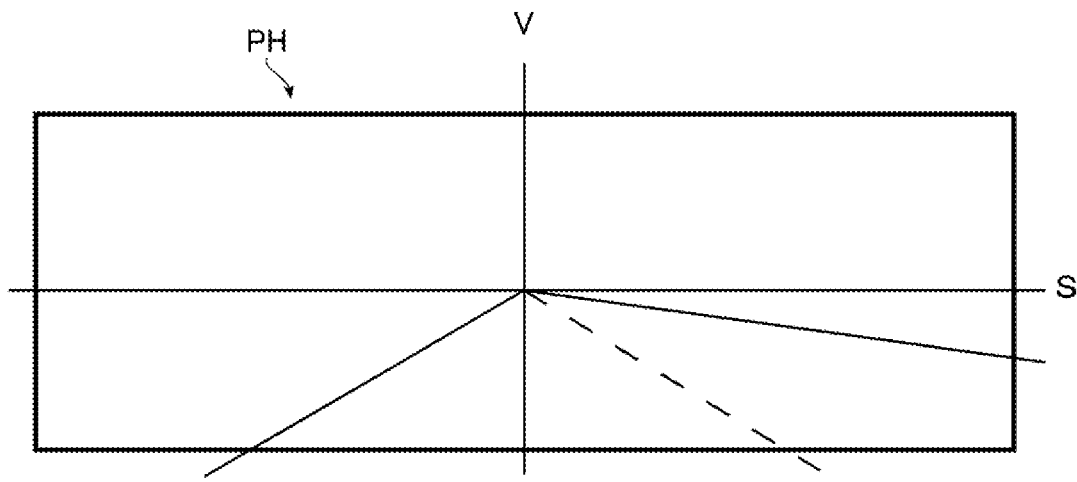
FIG. 6 is a diagram illustrating a light distribution pattern of a high beam according to the first embodiment.

FIG. 6 is a diagram illustrating a light distribution pattern of a high beam according to the present embodiment. In FIG. 6, S represents a horizontal line, V represents a vertical line passing through the center of the vehicle 100 in the left-right direction, and a high-beam light distribution pattern PH formed on a virtual vertical screen arranged 25 m ahead of the vehicle 100 is indicated by a thick line. According to the present embodiment, to emit a high beam, all the light emitting elements 13 emit light. Therefore, the outer shape of the light distribution pattern of the high beam matches the outer shape of the region 30. In addition, a hot zone which is a region having the highest light intensity in the high-beam light distribution pattern PH is located on or near an intersection of the horizontal line S and the vertical line V. The intensity of light in the high-beam light distribution pattern PH decreases as it goes away from the hot zone. Therefore, the light emitting element 13 is controlled such that the light intensity distribution is made in the above described manner.

(Step SP14)

In this step, the control unit CO controls the lamp unit 10 so that the light distribution pattern of the light emitted from the vehicle headlamp 1 becomes a light distribution pattern corresponding to the position of the boundary determined by the boundary determination unit 50. Then, the control unit CO returns the control flow to step SP11.

Figure 7:
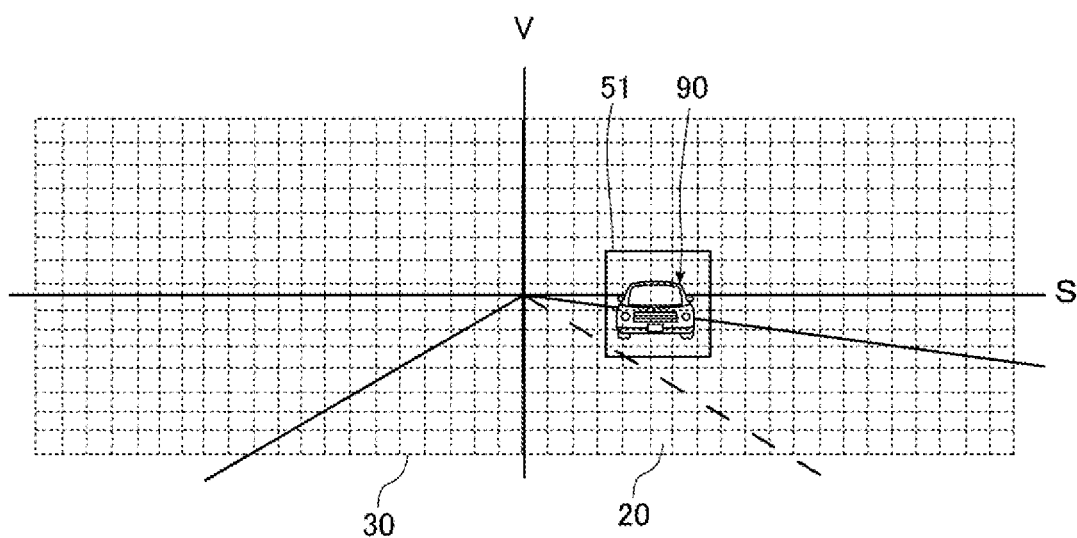
FIG. 7 is a diagram illustrating an example of a boundary determined by a boundary determination unit.
Figure 8:
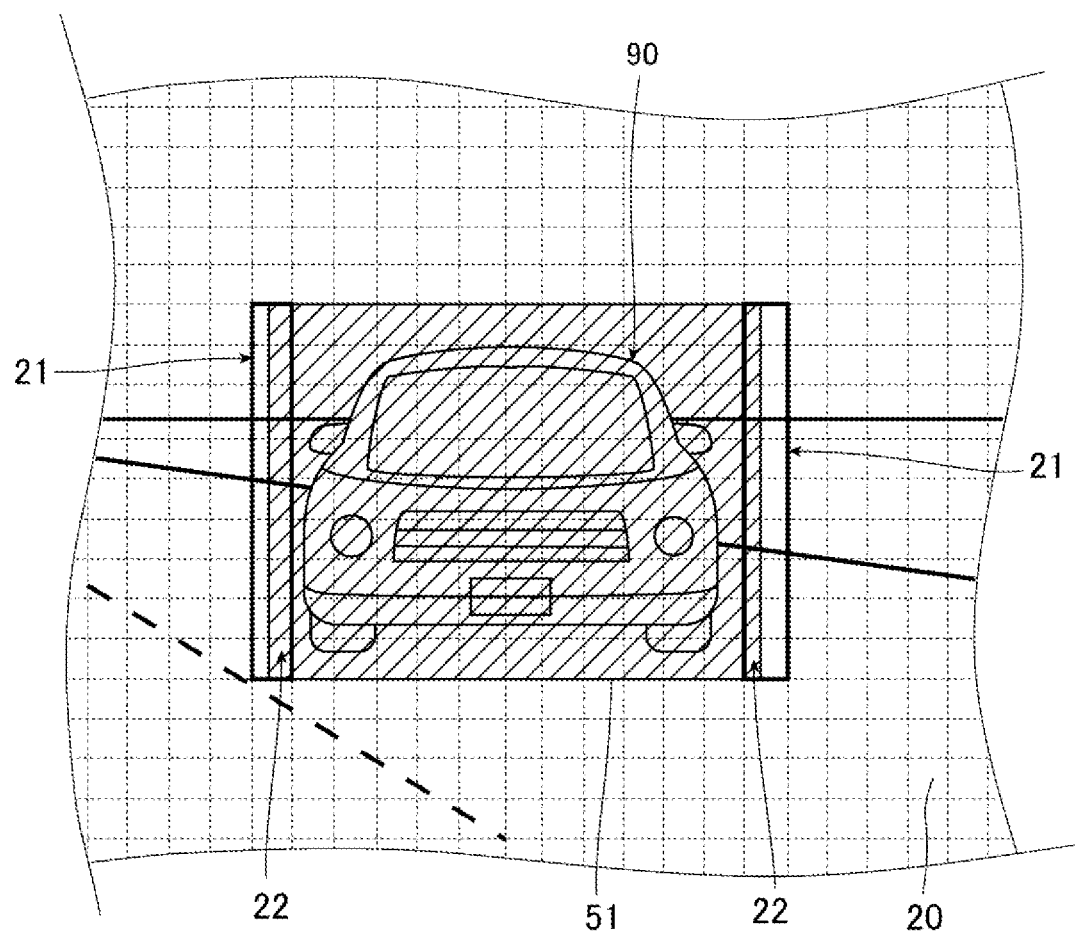
FIG. 8 is an enlarged view of a boundary and the vicinity of the boundary in FIG. 7.

FIG. 7 is a diagram illustrating an example of a boundary position determined by the boundary determination unit 50, and is a diagram illustrating an example of a boundary position determined when the other-vehicle detection unit 120 detects the other vehicle 90 that is an oncoming vehicle. FIG. 8 is an enlarged view of the boundary 51 and the vicinity of the boundary 51 in FIG. 7. In FIG. 7, S represents a horizontal line, V represents a vertical line passing through the center of the vehicle 100 in the left-right direction, the boundary 51 on a virtual vertical screen arranged 25 m ahead of the vehicle 100 is indicated by thick lines, and the irradiation spots 20 are indicated by broken lines. In FIGS. 7 and 8, the number of irradiation spots 20 is reduced for easy understanding.

As described above, according to the present embodiment, the boundary 51 has a rectangular shape surrounding the entire other vehicle 90 that is an oncoming vehicle, the inside of the boundary 51 is a dark region to be darkened, and the outside of the boundary 51 is a bright region to be brightened. Therefore, the dark region to be darkened overlaps the front window as a visibility area for the driver of the other vehicle 90, which is an oncoming vehicle, to visually recognize the outside of the vehicle. Based on the signal indicating the boundary 51 input from the boundary determination unit 50, the control unit CO controls the lamp unit 10 so that the illuminance of the light from the lamp unit 10 in the irradiation spots 20 overlapping only the dark region to be darkened becomes lower than the illuminance of the light from the lamp unit 10 in the irradiation spots 20 overlapping only the bright region to be brightened. Specifically, the control unit CO controls the light emitting elements 13 so that the amount of light emitted from the light emitting elements 13 that irradiate the irradiation spots 20 overlapping only the dark region becomes zero. Furthermore, the control unit CO controls the light emitting elements 13 so that the light amount of the light emitted from the light emitting elements 13 that irradiate the irradiation spots 20 overlapping only the bright region to be the same as the light amount when a high beam is emitted.

Furthermore, as illustrated in FIG. 8, in a case where there is an irradiation spot row 21 including the irradiation spots 20 overlapping the boundary 51, the control unit CO controls the lamp unit 10 so that the total amount of light from the lamp unit 10 with which the irradiation spot row 21 is irradiated decreases according to the proportion of a portion 22 in the irradiation spot row 21 overlapping the dark region. In FIG. 8, the irradiation spot row 21 is indicated by a thick line, and a dark region to be darkened is hatched with oblique lines. According to the present embodiment, the control unit CO controls the lamp unit 10 so that the illuminance of the light with which each irradiation spot 20 in the irradiation spot row 21 is irradiated is gradually lowered according to the proportion of the portion 22 in the irradiation spot 20 overlapping the dark region. The illuminance of the light irradiated to each irradiation spot 20 in the irradiation spot row 21 is equal to or lower than the illuminance of the light irradiated to the adjacent irradiation spots 20 in the bright region side of the irradiation spots 20, and equal to or more than the illuminance of the light irradiated to the adjacent irradiation spots 20 in the dark region side of the irradiation spots 20.

Figure 9:
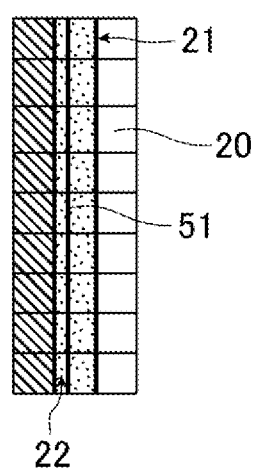
FIG. 9 is a diagram illustrating an example of a state in which the illuminance of the light irradiated to irradiation spots gradually decreases.
Figure 10:
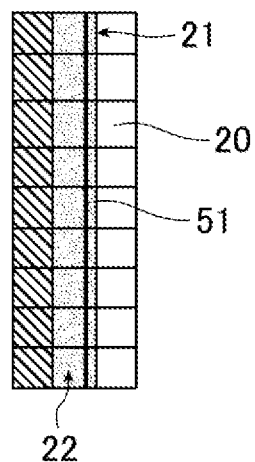
FIG. 10 is a diagram illustrating another example of the state in which the illuminance of the light irradiated to the irradiation spot gradually decreases.

FIG. 9 is a diagram illustrating an example of a state in which the illuminance of the light applied to the irradiation spots 20 gradually decreases. FIG. 10 is a diagram illustrating another example of the state in which the illuminance of the light irradiated to the irradiation spots 20 gradually decreases. In FIGS. 9 and 10, the non-hatched irradiation spots 20 are the irradiation spots 20 overlapping only the bright region, and is the irradiation spots 20 corresponding to the light emitting elements 13 whose light amount of the emitted light is the same as the light amount when a high beam is emitted. The hatched irradiation spots 20 are the irradiation spots 20 overlapping only the dark region, and is the irradiation spots 20 corresponding to the light emitting elements 13 whose light amount of emitted light is zero. The hatched irradiation spots 20 including a plurality of dots are the irradiation spots 20 constituting the irradiation spot row 21, and the plurality of dots in the hatching in FIG. 10 is finer than that in FIG. 9. The illuminance of the light irradiated to the irradiation spots 20 is lower as the dots in hatching are finer. The proportion of the portion 22 in the irradiation spot row 21 overlapping the dark region n FIG. 9 is 25%, and the proportion of the portion 22 in the irradiation spot row 21 overlapping the dark region in FIG. 10 is 75%. In a case where the proportion of the portion 22 in the irradiation spot row 21 overlapping the dark region is less than 50%, as illustrated in FIG. 9, the control unit CO of the present embodiment controls the light emitting elements 13 so that the light amount of the light emitted from the light emitting elements 13 that irradiate the respective irradiation spots 20 in the irradiation spot row 21 becomes a predetermined amount smaller than the light amount when the high beam is emitted. The light amounts emitted from these light emitting elements 13 are supposed to be the same, but may be different. When the proportion is 50% or more, as illustrated in FIG. 10, the control unit CO controls the light emitting elements 13 so that the light amount of the light emitted from the light emitting elements 13 that irradiate the respective irradiation spots 20 in the irradiation spot row 21 becomes smaller than the light amount in the state illustrated in FIG. 9. Therefore, according to the present embodiment, the illuminance of the light with which each irradiation spot 20 in the irradiation spot row 21 is irradiated decreases in two stages according to the above proportion.

Figure 11:
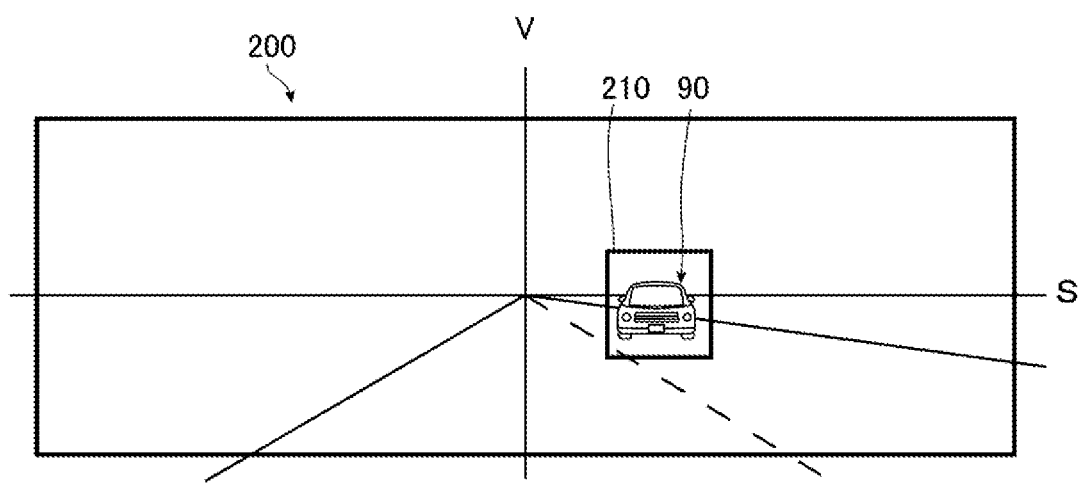
FIG. 11 is a view illustrating an example of the light distribution pattern according to the boundary in FIG. 8.

By controlling the lamp unit 10 in this manner by the control unit CO, as illustrated in FIG. 11, a light distribution pattern 200 in which a region 210 overlapping the irradiation spot 20 overlapping the dark region is darkened is formed among the high-beam light distribution patterns PH. The region 210 to be darkened overlaps the front window as a visibility area in the other vehicle 90. FIG. 11 is a view illustrating an example of a light distribution pattern corresponding to the boundary 51 in FIG. 8. In FIG. 11, S represents a horizontal line, V represents a vertical line passing through the center of the vehicle 100 in the left-right direction, and the light distribution pattern 200 on a virtual vertical screen arranged 25 m ahead of the vehicle 100 is indicated by a thick line.

(Step SP15)

In this step, no signal is input from the light switch 110 to the control unit CO. Therefore, the light switch 110 is turned off. The control unit CO controls the lamp unit 10 so that the light from the lamp unit 10 is not emitted, and the light from the vehicle headlamp 1 is not emitted. Then, the control flow returns to step SP11.

As described above, in the vehicle headlamp 1 according to the present embodiment, the emitted high-beam light distribution pattern PH is changed to the light distribution pattern 200 having the darkened region 210 when the position of the boundary 51 is determined by the boundary determination unit 50. Furthermore, as the position of the boundary 51 changes, the darkened region 210 changes.

Figure 12:
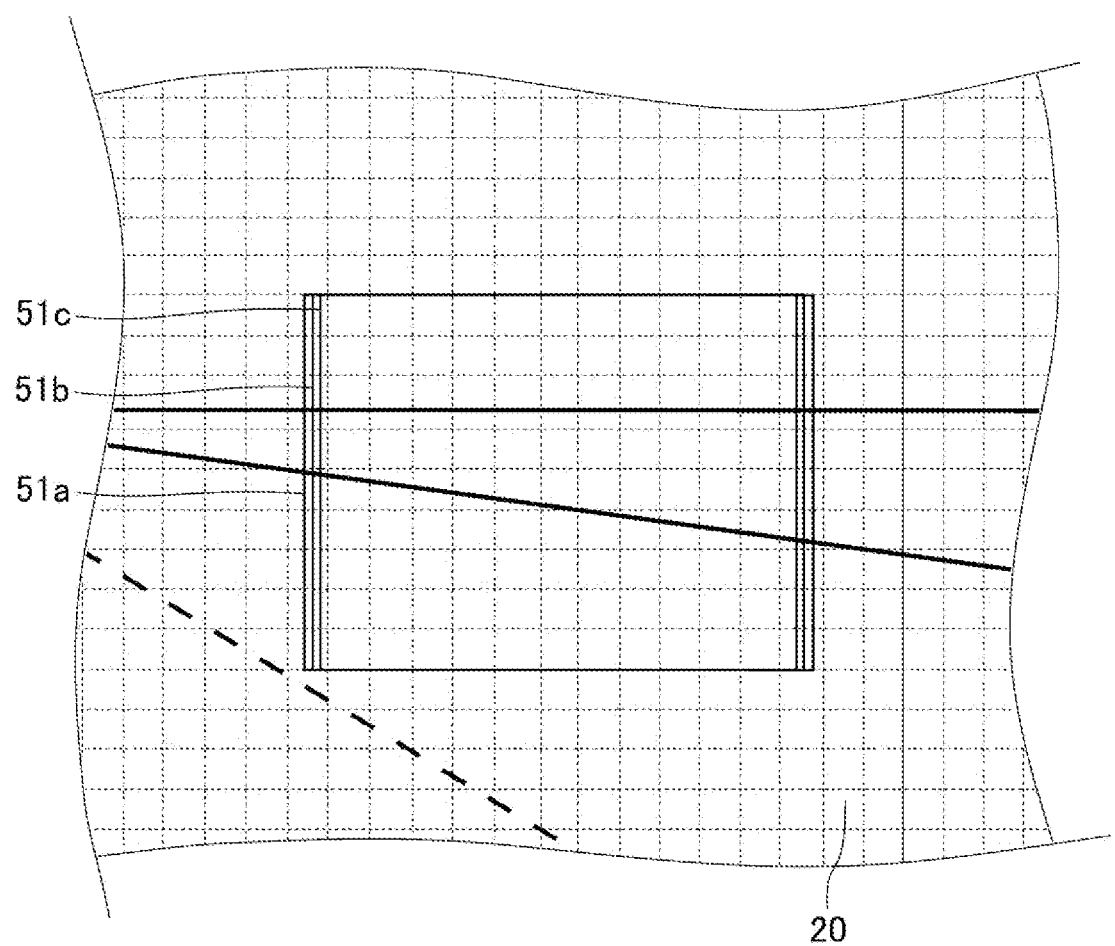
FIG. 12 is a view illustrating an example of a state in which a boundary changes.

FIG. 12 is a view illustrating an example of a state in which the boundary changes and is a view illustrating an example of a state in which the boundary changes so as to move in the left-right direction. As illustrated in FIG. 12, when the position of a boundary 51c determined based on the other-vehicle information input from the other-vehicle detection unit 120 at a certain first timing is different from the position of a boundary 51a at the first timing, the boundary determination unit 50 according to the present embodiment changes the position of the boundary in stages. This change in the position of the boundary is performed during a period from the first timing to a second timing at which the other-vehicle information is input from the other-vehicle detection unit 120 immediately after the first timing. In other words, the boundary determination unit 50 according to the present embodiment changes the position of the boundary in a stepwise manner during the period from the first timing to the second timing on the basis of the information on the position of the boundary 51a at the first timing and the other-vehicle information input at the first timing. In the example illustrated in FIG. 12, the boundary becomes the boundary 51c after becoming a boundary 51b from the boundary 51a, but the number of stages of change is not particularly limited. In addition, the manner of stepwise change of the boundary is not particularly limited. For example, when the boundary changes as if the boundary moves, the position of the boundary may be changed stepwise so that the boundary moves at a substantially constant speed. In addition, in a case where the boundary changes as if the boundary is deformed, the position of the boundary may be changed stepwise so that the shape of the boundary approaches the shape of the deformed boundary at a substantially constant rate.

Note that the control flow of the control unit CO is not particularly limited. Further, according to the present embodiment, the steering sensor 130, the inclination sensor 140, and the vehicle speed sensor 150 may not output signals to the boundary determination unit 50.

As described above, the vehicle headlamp 1 according to the present embodiment includes the lamp unit 10, the boundary determination unit 50, and the control unit CO. The lamp unit 10 includes the plurality of light emitting elements 13 capable of individually changing the amount of light emitted, and emits light from the plurality of light emitting elements 13 so that irradiation spots 20 irradiated with light from the respective light emitting elements 13 are arranged in a matrix. The boundary determination unit 50 determines the position of the boundary 51 between the bright region to be brightened and the dark region to be darker than the bright region in the region 30 where the lamp unit 10 can emit light. The control unit CO controls the lamp unit 10 based on the position of the boundary 51. Therefore, in the vehicle headlamp 1 according to the present embodiment, the light distribution pattern of the emitted light changes as the boundary 51 changes.

In addition, in the irradiation spot row 21 including the irradiation spots 20 overlapping the boundary 51, the control unit CO controls the lamp unit 10 so that the illuminance of the light radiating the respective irradiation spots 20 in the irradiation spot row 21 is equal to or less than the illuminance of the light radiating the adjacent irradiation spots 20 in the bright region side of the irradiation spots 20 and equal to or greater than the illuminance of the light irradiating the adjacent irradiation spots 20 in the dark region side of the irradiation spots 20. In addition, the control unit CO controls the lamp unit 10 so that the total amount of light from the lamp unit 10 irradiating the irradiation spot row 21 decreases depending to the proportion of the portion 22 in the irradiation spot row 21 overlapping the dark region. One side based on the irradiation spot row 21 is the brightened region, and the other side is the darkened region. The irradiation spot row 21 is located between the brightened region and the darkened region. The illuminance of the light irradiating the respective irradiation spots 20 in the irradiation spot row 21 is equal to or lower than the illuminance of the adjacent brightened region and equal to or higher than the illuminance of the adjacent darkened region. As described above, the total amount of light from the lamp unit 10 irradiating the irradiation spot row 21 decreases depending on the proportion of the portion 22 in the irradiation spot row 21 overlapping the dark region to be darkened. Therefore, in the vehicle headlamp 1 according to the present embodiment, when the position of the boundary 51 changes and the proportion increases, the irradiation spot row 21 becomes a region to be gradually darkened depending on the increase in the proportion. When the position of the boundary 51 changes and the proportion decreases, the irradiation spot row is gradually brightened depending on the decrease in the proportion. Therefore, in the vehicle headlamp 1 according to the present embodiment, the change in the light distribution pattern of the emitted light can be made smooth as compared with the case where the entire irradiation spot row 21 is changed from a region to be brightened to a region to be darkened or from a region to be darkened to a region to be brightened at a certain timing. Therefore, in the vehicle headlamp 1 according to the present embodiment, it is possible to reduce discomfort in the light distribution pattern of the emitted light as compared with this case.

In addition, in the vehicle headlamp 1 according to the present embodiment, the boundary determination unit 50 determines the position of the boundary 51 on the basis of other-vehicle information from the other-vehicle detection unit 120 that detects the other vehicle 90 so that the visibility area of the driver in the other vehicle 90 to visually recognize the outside of the vehicle overlaps with the dark region. In the vehicle headlamp 1 according to the present embodiment, the visibility area and the darkened region can overlap, and glare given to the driver of the other vehicle 90 can be suppressed.

In addition, in the vehicle headlamp 1 according to the present embodiment, the boundary determination unit 50 changes in stages the position of the boundary 51 during a period from the first timing to the second timing at which the other-vehicle information from the other-vehicle detection unit 120 is input immediately after the first timing on the basis of the information on the position of the boundary at the first timing at which the other-vehicle information from the other-vehicle detection unit 120 is input and the other-vehicle information input at the first timing. Therefore, in the vehicle headlamp 1 according to the present embodiment, the changes in the light distribution pattern of the emitted light can be made smoother, and it is possible to further reduce the sense of discomfort with the changes in the light distribution pattern.

From the viewpoint of making the changes in the light distribution pattern of the emitted light smoother, the boundary determination unit 50 may change the boundary 51 as follows. According to the present embodiment, as described above, the information on the temporal change of the position of the boundary 51 is stored in the memory ME. Therefore, the boundary determination unit 50 may change in stages the position of the boundary 51 during a period from the first timing to the second timing at which the other-vehicle information is input from the other-vehicle detection unit 120 immediately after the first timing on the basis of information on temporal changes of the position of the boundary 51 in a predetermined period before the first timing including the first timing at which the other-vehicle information is input from the other-vehicle detection unit 120 and the other-vehicle information from the other-vehicle detection unit 120 input at the first timing. Even with such a configuration, the changes in the light distribution pattern of the emitted light can be made smoother. Furthermore, with such a configuration, for example, in a case where the temporal changes in the position of the boundary are the changes in which the boundary moves at a predetermined acceleration, the position of the boundary can be changed stepwise so that the boundary moves at a speed corresponding to the acceleration. Therefore, according to such a configuration, the position of the boundary can be changed stepwise according to the temporal changes of the position of the boundary, and the changes in the light distribution pattern of the emitted light can be made smoother. Note that the boundary determination unit 50 may predict the position of the boundary at the second timing on the basis of the information on the temporal changes of the position of the boundary 51 and the other-vehicle information from the other-vehicle detection unit 120 input at the first timing, and may change the position of the boundary in a stepwise manner during the period from the first timing to the second timing on the basis of the temporal changes of the position of the boundary 51 and the information on the predicted position of the boundary.

In addition, in the vehicle headlamp 1 according to the present embodiment, the control unit CO controls the lamp unit 10 so that the illuminance of the light irradiating the respective irradiation spots 20 in the irradiation spot row 21 decreases stepwise according to the proportion of the portion 22 in the irradiation spot 20 overlapping the dark region. Therefore, in the vehicle headlamp 1 according to the present embodiment, the changes in the light distribution pattern of the emitted light can be made smoother, and it is possible to further reduce the sense of discomfort with the changes in the light distribution pattern. In addition, in the vehicle headlamp 1 according to the present embodiment, the calculation load of the control unit CO can be reduced as compared with the case where the illuminance of the light continuously decreases according to the proportion. Note that the number of stages at which the illuminance decreases according to the above proportion is not particularly limited, but is preferably 16 or less from the viewpoint of reducing the calculation load of the control unit CO. In addition, the number of stages may be different between a case where the position of the boundary 51 changes so that the proportion increases and a case where the position of the boundary 51 changes so that the proportion decreases. For example, the number of stages in a case where the position of the boundary 51 changes so that the proportion increases may be smaller than that in a case where the position of the boundary 51 changes so that the proportion decreases. The case where the position of the boundary 51 changes so that the proportion increases is a state where the position of the boundary 51 changes so that the irradiation spot row 21 becomes a darkened region. The case where the position of the boundary 51 changes so that the proportion decreases is a state where the position of the boundary 51 changes so that the irradiation spot row 21 becomes a brightened region. Therefore, with such a configuration, for example, in a state where the speed of the changes in the position of the boundary 51 is constant, the time required for the irradiation spot row 21 to become a darkened region can be made shorter than that in a case where the irradiation spot row 21 becomes a brightened region. Therefore, the glare given to the driver in the other vehicle 90 can be suppressed while suppressing the increase in the calculation load of the control unit CO as compared with the case where the number of stages is constant regardless of the way of changing the position of the boundary 51.

Second Embodiment

Next, a second embodiment of the present invention will be described in detail. Note that the same or equivalent components as those of the first embodiment are denoted by the same reference numerals and redundant description is omitted unless otherwise specified. The present embodiment is different from the first embodiment in a light distribution pattern of light emitted when the position of the boundary 51 is determined.

Figure 13:
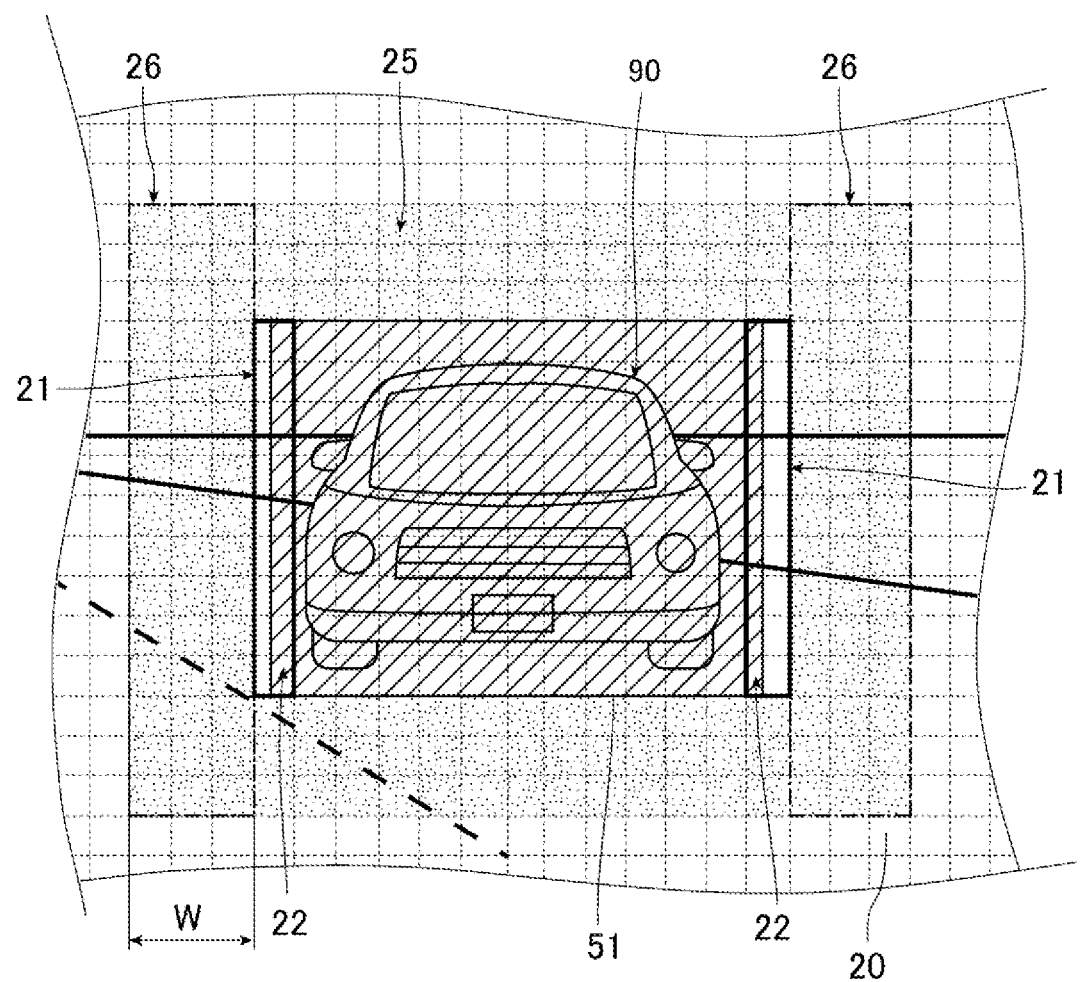
FIG. 13 is a diagram for explaining control of the lamp unit according to a second embodiment.

FIG. 13 is a diagram for explaining the control of the lamp unit 10 according to the present embodiment, and is a diagram illustrating the vicinity of the boundary 51 and the irradiation spots 20 in the vicinity of the boundary 51 similarly to FIG. 8. The control unit CO of the present embodiment controls the lamp unit 10 so as to form a blurred region that overlaps the bright region and is adjacent to the boundary 51, and the illuminance of the irradiated light gradually is lowered as approaching the boundary 51. Specifically, in FIG. 13, the light emitting elements 13 that irradiate ab irradiation spot group 25 formed of the hatched irradiation spots 20 including a plurality of dots is controlled such that the irradiation spot group 25 becomes a blurred region. The irradiation spots 20 in the irradiation spot group 25 are a plurality of rows of irradiation spots 20 that overlap only the bright region and are arranged along the boundary 51. The illuminance of the light irradiating the irradiation spots 20 in the irradiation spot group 25 is lower than the illuminance of the light irradiating the irradiation spots 20 of a case where the high beam is emitted. In the plurality of irradiation spots 20 arranged in the direction perpendicular to the boundary 51, the illuminance of the light irradiating the irradiation spots 20 located on the boundary 51 side is lower than the illuminance of the light irradiating the irradiation spots 20 located on the opposite side to the boundary 51 side. In addition, the control unit CO controls the light emitting elements 13 so that the light amount of the light emitted from the light emitting elements 13 that irradiate the irradiation spots 20 overlapping only the bright region other than the irradiation spots 20 in the irradiation spot group 25 becomes the light amount when the high beam is emitted. In addition, similarly to the first embodiment, the control unit CO controls the light emitting elements 13 so that the amount of light emitted from the light emitting elements 13 that irradiate the irradiation spots 20 overlapping only the dark region becomes zero.

Figure 14:
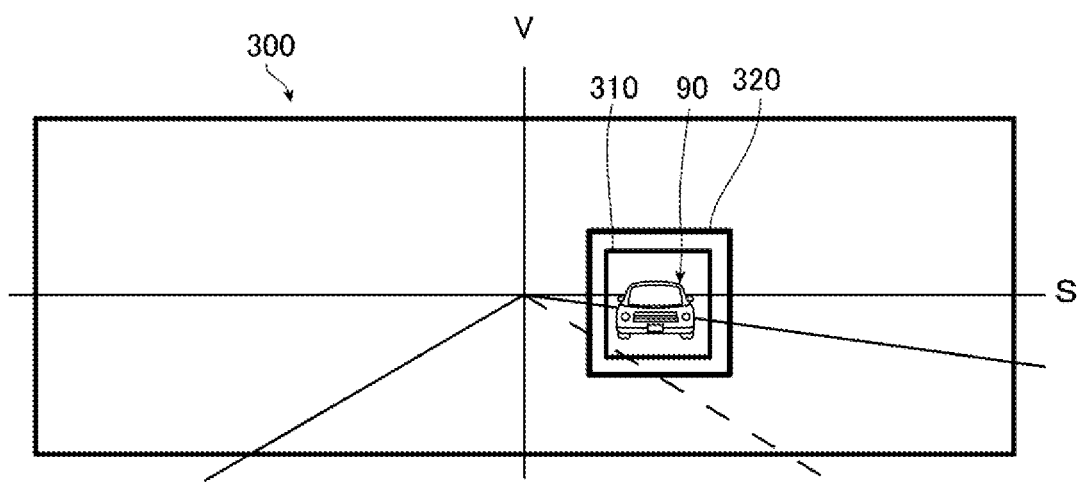
FIG. 14 is a view illustrating an example of a light distribution pattern according to the second embodiment similarly to FIG. 11.

By controlling the lamp unit 10 in this manner by the control unit CO, as illustrated in FIG. 14, in the high-beam light distribution pattern PH, a region 310 overlapping the irradiation spots 20 overlapping the dark region is darkened, and a light distribution pattern 300 in which the intensity of light in a region 320 overlapping the irradiation spot group 25 is gradually lowered as approaching the region 310 is formed. The region 310 overlaps a front window as a visibility area in the other vehicle 90. The region 320 is the above-described blurred region and extends along the outer edge of the region 310. FIG. 14 is a view illustrating an example of the light distribution pattern according to the present embodiment similarly to FIG. 11, and is an example of the light distribution pattern according to the boundary 51 illustrated in FIG. 8.

In the vehicle headlamp 1 according to the present embodiment, it is possible to reduce the discomfort of the change in the light distribution pattern as compared with the case where the blurred region is not formed.

In addition, as illustrated in FIG. 13, in a case where there is the irradiation spot row 21, the control unit CO according to the present embodiment controls the lamp unit 10 so that the total amount of light from the lamp unit 10 irradiated to a portion 26 of the blurred region that is closer to the bright region than the irradiation spot row 21 decreases according to the proportion of the portion 22 overlapping the dark region in the irradiation spot row 21. In FIG. 13, the portion 26 on the bright region side of the irradiation spot row 21 in the blurred region is surrounded by a one-dot chain line. In the vehicle headlamp 1 according to the present embodiment, as the total amount of light emitted from the lamp unit 10 to the irradiation spot row 21 decreases, the total amount of light emitted from the lamp unit 10 to the portion 26 decreases. In addition, as the total amount of light from the lamp unit 10 irradiating the irradiation spot row 21 increases, the total amount of light from the lamp unit 10 irradiating the portion 26 increases. For this reason, the difference between the brightness of the irradiation spot row 21 and the brightness of the portion 26 can be reduced, and the sense of discomfort in the change in the light distribution pattern can be reduced.

Note that the width W in the direction perpendicular to the boundary 51 in the blurred region is not particularly limited, and the width W may not be constant, and the width W may change according to the proportion of the portion 22 in the irradiation spot row 21 overlapping the dark region.

Third Embodiment

Next, a third embodiment of the present invention will be described in detail. Note that the same or equivalent components as those of the first embodiment are denoted by the same reference numerals and redundant description is omitted unless otherwise specified. In the present embodiment, the position of the boundary 51 determined by the boundary determination unit 50 is different from that in the first embodiment.

The boundary determination unit 50 according to the present embodiment determines the position of the boundary 51 such that a predetermined region from the outer edge of the region 30 to which the lamp unit 10 can emit light becomes a dark region on the basis of self-vehicle information from the steering sensor 130, the inclination sensor 140, and the vehicle speed sensor 150 which are travel state detection units that detect a travel state of the own vehicle.

Figure 15:
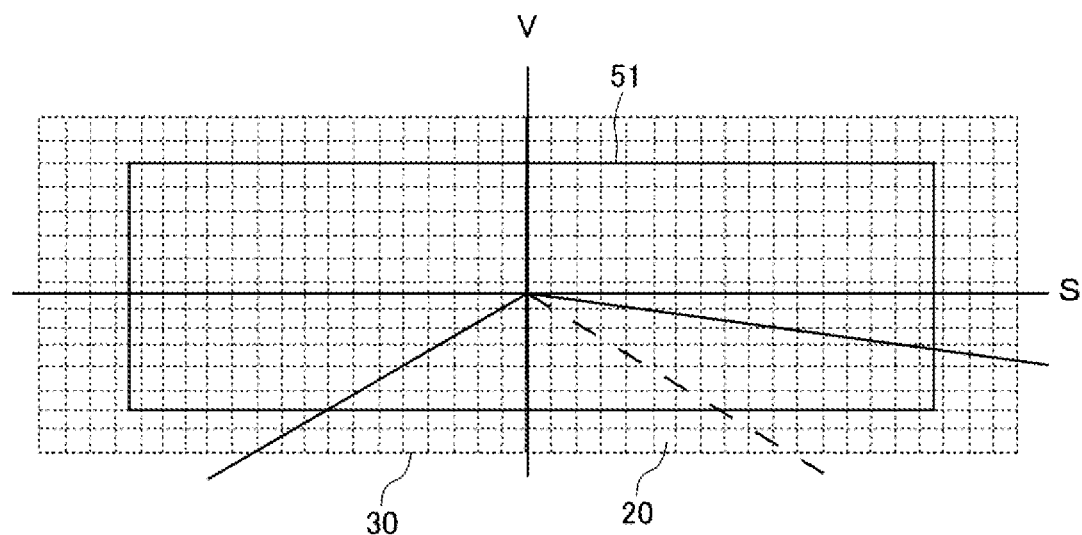
FIG. 15 is a diagram illustrating an example of a boundary determined by a boundary determination unit according to a third embodiment.

FIG. 15 is a diagram illustrating an example of the position of the boundary determined by the boundary determination unit 50 according to the present embodiment, and is a diagram illustrating an example of the position of the boundary determined when the steering angle and the inclination angle are zero and the vehicle speed is equal to or less than a predetermined speed, similarly to FIG. 7.

The boundary 51 of the present embodiment corresponds to the outer shape of the light distribution pattern emitted from the vehicle headlamp 1, corresponds to the outer shape of the light distribution pattern of a high beam having a rectangular shape elongated in the left-right direction, and is separated from the outer edge of the region 30. A region from the outer edge of the region 30 to the boundary 51 is a dark region to be darkened, and the inside of the boundary 51 is a bright region to be lightened. The boundary determination unit 50 moves the position of the entire boundary 51 in the left-right direction by a predetermined distance according to the steering angle. The predetermined distance according to the steering angle is a distance based on the position of the boundary 51 illustrated in FIG. 15, and is a distance in the left direction when the steering angle is a steering angle to the left, and is a distance in the right direction when the steering angle is a steering angle to the right. In addition, the predetermined distance corresponding to the steering angle is short when the steering angle is small, and is long when the steering angle is large. In the present embodiment, the predetermined distance becomes gradually longer as the steering angle increases. In addition, the boundary determination unit 50 moves the position of the entire boundary 51 in the vertical direction by a predetermined distance according to the inclination angle. The predetermined distance according to the inclination angle is a distance based on the position of the boundary 51 illustrated in FIG. 15, and is a distance in the downward direction when the inclination angle is the upward inclination angle, and is a distance in the upward direction when the inclination angle is the downward inclination angle. In addition, the predetermined distance according to the inclination angle is short when the inclination angle is small, and is long when the inclination angle is large. In the present embodiment, the predetermined distance becomes gradually longer as the inclination angle increases. In addition, when the vehicle speed exceeds a predetermined speed, for example, 60 km/h, the boundary determination unit 50 changes the position of the boundary 51 so that the width of the boundary 51 in the left-right direction is about 4/5.

The control unit CO according to the present embodiment controls the light emitting elements 13 so that the amount of light emitted from the light emitting elements 13 that irradiates the irradiation spots 20 overlapping only the dark region becomes zero. Furthermore, the control unit CO controls the light emitting elements 13 that irradiates the irradiation spots 20 overlapping only the bright region such that the illuminance of light in the region including the irradiation spot 20 overlapping only the light region decreases as it goes away from the center portion of the region. Therefore, the outer shape of the light distribution pattern of the light emitted from the vehicle headlamp 1 according to the present embodiment is substantially the same as the boundary 51. Further, in the vehicle headlamp according to the present embodiment, when the traveling speed of the vehicle 100 exceeds a predetermined speed, the outer shape of the light distribution pattern can be changed so that the width in the left-right direction of the light distribution pattern of the emitted light is reduced. Therefore, in the vehicle headlamp according to the present embodiment, the line of sight of the driver during high-speed traveling can be easily concentrated in the vicinity of the central portion in front of the vehicle, and visibility in the distance can be improved. Further, in the vehicle headlamp according to the present embodiment, the direction in which the predetermined light distribution pattern is emitted can be changed according to the steering angle and the inclination angle of the vehicle 100. Therefore, according to the vehicle headlamp of the present embodiment, it is possible to irradiate the proceeding area with light in the curved road, and it is possible to emit light in an appropriate direction even if the vehicle 100 is inclined in the pitch direction. Therefore, in the vehicle headlamp 1 according to the present embodiment, the visibility in the traveling direction can be improved as compared with the case where the light emission direction does not change according to the steering angle or the inclination angle of the vehicle 100.

Although the present invention has been described by taking the above-described embodiment as an example, the present invention is not limited thereto.

For example, in the above embodiment, the control unit CO that controls the lamp unit 10 so that the illuminance of the light irradiating the respective irradiation spots 20 in the irradiation spot row 21 gradually decreases according to the proportion of the portion 22 in the irradiation spots 20 overlapping the dark region has been described as an example. However, the control unit CO may control the lamp unit 10 so that the total amount of light from the lamp unit 10 irradiating the irradiation spot row 21 decreases according to the proportion of the portion 22 in the irradiation spot row 21 overlapping the dark region. For example, the control unit CO may control the lamp unit 10 so that the illuminance of the light irradiating the respective irradiation spots 20 in the irradiation spot row 21 is continuously lowered according to the proportion of the portion 22 in the irradiation spot 20 overlapping the dark region. In addition, the control unit CO may control the lamp unit 10 so that the illuminance of the light irradiating at least one irradiation spot 20 in the irradiation spot row 21 decreases stepwise according to the proportion of the portion 22 in the irradiation spot 20 overlapping the dark region. Furthermore, the control unit CO may control the lamp unit 10 as in a modification described below.

Figure 16:
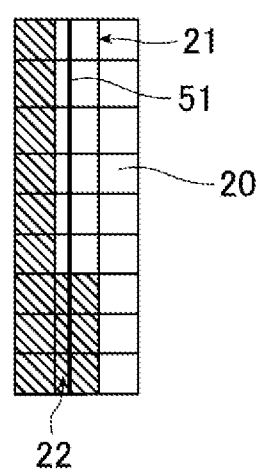
FIG. 16 is a diagram illustrating an example of a state in which the illuminance of light irradiated to irradiation spots changes in a modified example.
Figure 17:
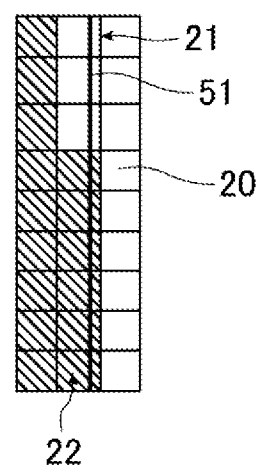
FIG. 17 is a diagram illustrating another example of the state in which the illuminance of light irradiated to the irradiation spots changes in a modified example.

FIG. 16 is a diagram illustrating an example of a state in which the illuminance of the light irradiated to the irradiation spots 20 changes in the modification, and FIG. 17 is a diagram illustrating another example of the state in which the illuminance of the light irradiated to the irradiation spots 20 changes in the modification. In FIGS. 16 and 17, the non-hatched irradiation spots 20 are the irradiation spots 20 corresponding to the light emitting elements 13 in which the light amount of the emitted light is the same as the light amount when the high beam is emitted. The irradiation spots 20 hatched with oblique lines are the irradiation spots 20 corresponding to the light emitting elements 13 in which the amount of emitted light is zero. The proportion of the portion 22 in the irradiation spot row 21 overlapping the dark region in FIG. 16 is 25%, and the proportion of the portion 22 in the irradiation spot row 21 overlapping the dark region in FIG. 17 is 75%. The control unit CO of the present modification controls the lamp unit 10 so that the illuminance of the light with which some of the irradiation spots 20 in the irradiation spot row 21 are irradiated becomes the illuminance of the light with which the irradiation spots 20 adjacent to the dark region side of the irradiation spot is irradiated. In addition, the control unit CO according to the present modification controls the lamp unit so that the number of irradiation spots 21 in the irradiation spot row in which the illuminance of the irradiated light becomes the illuminance of the light irradiated to the irradiation spot 20 adjacent to the irradiation spot 20 on the dark region side of the irradiation spot 20 increases according to the proportion of the portion 22 overlapping the dark region in the irradiation spot row 21. Specifically, when the proportion of the portion 22 in the irradiation spot row 21 overlapping the dark region is less than 50%, as illustrated in FIG. 16, the light emitting elements 13 are controlled such that the light amount of the light emitted from the light emitting elements 13 that irradiate a part of the irradiation spots 20 in the irradiation spot row 21 becomes zero. When the proportion is 50% or more, as illustrated in FIG. 17, the control unit CO controls the light emitting elements 13 such that the number of light emitting elements 13 in which the amount of emitted light becomes zero among the light emitting elements 13 that irradiate the irradiation spot 20 in the irradiation spot row 21 is larger than that in a case where the proportion is less than 50%. In the present modification, the illuminance of the irradiated light is the illuminance of the light irradiated to the adjacent irradiation spots 20 in the dark region side in order from the irradiation spots 20 located on one end side in the irradiation spot row 21 according to the above proportion. However, the order of the irradiation spots 20 in which the illuminance of the irradiated light becomes the illuminance of the light irradiated to the adjacent irradiation spots 20 in the dark region side is not particularly limited. For example, the illuminance of the irradiated light may be the illuminance of the light irradiated to the adjacent irradiation spots 20 in the dark region side in order from the irradiation spots 20 located on the center side of the irradiation spot row 21. Further, the control unit CO may control the lamp unit 10 so that the illuminance of the light irradiating some of the irradiation spots 20 in the irradiation spot row 21 is gradually decreased according to the proportion of the portion overlapping the dark region in the irradiation spots 20, and the number of irradiation spots 21 in the irradiation spot row 21 in which the illuminance of the irradiated light becomes the illuminance of the light irradiating the adjacent irradiation spots 20 in the dark region side of the irradiation spots 20 is increased according to the proportion of the portion in the irradiation spot row 20 overlapping the dark region.

In the first and second embodiments, the amount of light emitted from the light emitting element 13 that irradiates the irradiation spot 20 overlapping only the dark region is set to zero. However, the illuminance of the light irradiating the irradiation spots 20 overlapping only the dark region may be lower than the illuminance of the light irradiating the irradiation spots 20 overlapping only the bright region. Therefore, the amount of light emitted from the light emitting elements 13 that irradiate the irradiation spots 20 overlapping only the dark region may not be zero.

In the third embodiment, the boundary determination unit 50 that determines the position of the boundary 51 on the basis of the self-vehicle information from the steering sensor 130, the inclination sensor 140, and the vehicle speed sensor 150, which are the travel state detection units, has been described as an example. However, the boundary determination unit 50 may determine the position of boundary 51 based on the self-vehicle information from the travel state detection unit that detects the travel state of vehicle 100. For example, the boundary determination unit 50 may determine the boundary 51 on the basis of the self-vehicle information from at least one of the steering sensor 130, the inclination sensor 140, and the vehicle speed sensor 150.

In the third embodiment, the boundary determination unit 50 that determines the position of the boundary 51 corresponding to the outer shape of the light distribution pattern of the high beam has been described as an example. However, the boundary determination unit 50 may determine the position of the boundary 51 so that a predetermined region from the outer edge of the region 30 where the lamp unit 10 can emit light becomes a dark region. According to such a configuration, at least a part of the outer shape of the light distribution pattern of the emitted light is substantially the same as at least a part of the boundary. Therefore, according to such a configuration, the outer shape of the light distribution pattern of the emitted light can be changed or the emission direction of the light having a predetermined light distribution pattern can be changed according to the travel state of the self-vehicle. Therefore, for example, the boundary determination unit 50 may determine the position of the boundary 51 corresponding to the outer shape of the light distribution pattern of the low beam. The shape of the boundary 51 is not particularly limited, and the boundary 51 may be connected to the outer edge of the region 30.

In addition, the above-described embodiments can be appropriately combined. For example, the first embodiment and the third embodiment may be combined, and the boundary determination unit 50 in the first embodiment may determine the position of the boundary according to the first embodiment and the position of the boundary according to the second embodiment. With such a configuration, it is possible to change an outer shape of a light distribution pattern of emitted light or change an emission direction of light having a predetermined light distribution pattern while suppressing glare given to a driver of another vehicle. In addition, in the third embodiment, the control unit CO may control the lamp unit 10 so as to form the blurred region described in the second embodiment. Also in the third embodiment, the number of stages when the illuminance of the light irradiating the respective irradiation spots 20 in the irradiation spot row 21 is gradually decreased according to the proportion of the portion 22 in the irradiation spot 20 overlapping the dark region is not particularly limited. As described above, the number of stages may be different between a case where the position of the boundary 51 changes so that the proportion increases and a case where the position of the boundary 51 changes so that the proportion decreases. For example, the number of stages in a case where the position of the boundary 51 changes so that the proportion increases may be smaller than that in a case where the position of the boundary 51 changes so that the proportion decreases.

In the above embodiments, the lamp unit 10 including the light distribution pattern forming unit 12 including the plurality of light emitting elements 13 capable of individually changing the amount of emitted light has been described as an example. However, the lamp unit 10 only needs to include a plurality of light emitting units capable of individually changing the amount of light to be emitted, and emit light from the plurality of light emitting units so that irradiation spots irradiated with light from the respective light emitting units are arranged in a matrix. For example, the lamp unit 10 may include a light distribution pattern forming unit including a digital mirror device (DMD) including a plurality of reflective elements arranged in a matrix and a light source unit that irradiates the DMD with light. The DMD can adjust the amount of light emitted in a predetermined direction from the reflecting surface of each reflective element, and irradiation spots irradiated with the light emitted in the predetermined direction from each reflecting element are arranged in a matrix. Therefore, it can be understood that the reflecting surface of each reflective element corresponds to the light emitting unit.

In the above embodiments, the description has been given by exemplifying the lamp 5 including one lamp unit 10. However, the lamp 5 may further include a lamp unit different from the lamp unit 10, and the vehicle headlamp 1 may form a predetermined light distribution pattern by light emitted from the lamp unit 10 and light emitted from another lamp unit. In this case, the configuration of another lamp unit is not particularly limited, and may be the same as the configuration of the lamp unit 10, for example.

According to the present invention, there is provided a vehicle headlamp that can reduce discomfort caused by changes in the light distribution patterns of emitted light, and the vehicle headlamp can be used in the field of vehicle headlamps such as automobiles.

The invention claimed is:

1. A vehicle headlamp comprising:
   a lamp unit that has a plurality of light emitting units capable of individually changing a light amount to emit, and emits light from the plurality of light emitting units such that irradiation spots irradiated with the light from the respective light emitting units are arranged in a matrix;
   a boundary determination unit that determines a position of a boundary between a bright region to be brightened in a region where the lamp unit can emit light and a dark region to be made darker than the bright region; and
   a control unit that controls the lamp unit, wherein
   the control unit controls the lamp unit such that, in an irradiation spot row formed of the irradiation spots that overlap the boundary, an illuminance of light irradiated to the irradiation spots in the irradiation spot row becomes equal to or lower than an illuminance of light irradiated to the adjacent irradiation spots in the bright region side of the irradiation spots and equal to or greater than an illuminance of light irradiated to the adjacent irradiation spots in the dark region side of the irradiation spots, and a total amount of light irradiated from the lamp unit to the irradiation spot row becomes smaller according to a proportion of a portion in the irradiation spot row that overlaps the dark region.

2. The vehicle headlamp according to claim 1, wherein the boundary determination unit determines the position of the boundary so that a visibility area that a driver of another vehicle visually recognizes outside of the vehicle and the dark region overlap based on other-vehicle information from an other-vehicle detection unit that detects other vehicles.

3. The vehicle headlamp according to claim 2, wherein based on the boundary position information at a first timing at which the other-vehicle information is input and the other-vehicle information, the boundary determination unit changes in stages the position of the boundary during a period from the first timing to a second timing when the other-vehicle information is input immediately after the first timing.

4. The vehicle headlamp according to claim 2, wherein based on information on temporal changes of the boundary position in a predetermined period before a first timing including the first timing at which the other-vehicle information is input, and the other-vehicle information, the boundary determination unit changes in stages the position of the boundary during a period from the first timing to a second timing when the other-vehicle information is input immediately after the first timing.

5. The vehicle headlamp according to claim 1, wherein the boundary determination unit determines the position of the boundary so that a predetermined region becomes the dark region from an outer edge of the region to which the lamp unit can irradiate light based on self-vehicle information from a travel state detection unit that detects a travel state of the self-vehicle, and the control unit controls the lamp unit so that an amount of the light emitted from the light emitting unit corresponding to the irradiation spot overlapping only the dark region becomes zero.

6. The vehicle headlamp according to claim 5, wherein based on the boundary position information at a first timing at which the self-vehicle information is input and the self-vehicle information, the boundary determination unit changes in stages the position of the boundary during a period from the first timing to a second timing when the self-vehicle information is input immediately after the first timing.

7. The vehicle headlamp according to claim 5, wherein based on information on temporal changes of the boundary position in a predetermined period before a first timing including the first timing at which the self-vehicle information is input, and the self-vehicle information, the boundary determination unit changes in stages the position of the boundary during a period from the first timing to a second timing when the self-vehicle information is input immediately after the first timing.

8. The vehicle headlamp according to claim 1, wherein the control unit controls the lamp unit so that the illuminance of light irradiated to at least one of the irradiation spots in the irradiation spot row becomes lower according to a proportion of a portion in the irradiation spot that overlaps the dark region.

9. The vehicle headlamp according to claim 8, wherein the control unit controls the lamp unit so that the illuminance of light becomes lower in stages according to the proportion.

10. The vehicle headlamp according to claim 9, wherein a number of stages of the changes of the illuminance of light when the position of the boundary changes so that the proportion increases is fewer than a number of stages of the changes of the illuminance of light in a case where the position of the boundary changes so that the proportion decreases.

11. The vehicle headlamp according to claim 1, wherein the control unit controls the lamp unit so that the illuminance of light irradiating a part of the irradiation spots in the irradiation spot row is the illuminance of light irradiating the adjacent irradiation spots in the dark region side of the irradiation spots, and the number of the irradiation spots in the irradiation spot row in which the illuminance of light irradiated is the illuminance of light irradiated to the adjacent irradiation spots in the dark region side of the irradiation spots increases according to the proportion of the portion in the irradiation spot row that overlaps the dark region.

12. The vehicle headlamp according to claim 1, wherein the control unit controls the lamp unit so that there formed
- a blurred region that overlaps only the bright region and is adjacent to the boundary and that the illuminance of irradiated light becomes lowered in stages as approaching the boundary.

13. The vehicle headlamp according to claim 12, wherein the control unit controls the lamp unit so that, in a case
- there is the irradiation spot row, a total amount of light from the lamp unit irradiated to a portion of the blurred region that is closer to the bright region than the irradiation spot row decreases according to the proportion of the portion in the irradiation spot row overlapping the dark region.

* * * * *